(12) United States Patent
Michalik et al.

(10) Patent No.: US 11,499,474 B2
(45) Date of Patent: Nov. 15, 2022

(54) SYSTEM FOR STARTUP SUPPORT OF EXTERNALLY HEATED TURBINE ENGINE

(71) Applicant: Rolls-Royce North American Technologies Inc., Indianapolis, IN (US)

(72) Inventors: Alexander Michalik, Indianapolis, IN (US); Daniel G. Edwards, Brownsburg, IN (US); Andrew J. Eifert, Indianapolis, IN (US); Brian T. Spangler, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 28 days.

(21) Appl. No.: 17/170,277

(22) Filed: Feb. 8, 2021

(65) Prior Publication Data
US 2022/0252006 A1   Aug. 11, 2022

(51) Int. Cl.
| | | |
|---|---|---|
| *F02C 1/05* | (2006.01) | |
| *F02C 7/08* | (2006.01) | |
| *F02C 6/18* | (2006.01) | |
| *F02C 1/04* | (2006.01) | |
| *F01K 3/18* | (2006.01) | |
| *F02C 6/16* | (2006.01) | |
| *F22B 1/18* | (2006.01) | |

(52) U.S. Cl.
CPC ............... *F02C 1/05* (2013.01); *F01K 3/181* (2013.01); *F02C 1/04* (2013.01); *F02C 6/18* (2013.01); *F02C 7/08* (2013.01); *F01K 3/185* (2013.01); *F02C 6/16* (2013.01); *F05D 2220/50* (2013.01); *F05D 2220/76* (2013.01); *F22B 1/1823* (2013.01)

(58) Field of Classification Search
CPC ...... F02C 1/05; F02C 6/18; F02C 7/08; F02C 1/04–06; F01K 3/181; G21D 5/08
See application file for complete search history.

(56) References Cited

U.S. PATENT DOCUMENTS

| | | | |
|---|---|---|---|
| 3,663,364 A * | 5/1972 | Thompson | G21C 1/326 376/394 |
| 3,864,919 A | 2/1975 | Frutschi | |
| 4,293,384 A * | 10/1981 | Weber | G21D 9/00 376/391 |
| 4,761,957 A | 8/1988 | Eberhardt et al. | |
| 5,165,239 A | 11/1992 | Bechtel et al. | |

(Continued)

OTHER PUBLICATIONS

Ka At-Attab and Za Zainal, Externally Fired Gas Turbine Technology: A Review, Aug. 8, 2014, 14 pages.

(Continued)

*Primary Examiner* — Gerald L Sung
*Assistant Examiner* — Rene D Ford
(74) *Attorney, Agent, or Firm* — Barnes & Thornburg LLP

(57) ABSTRACT

A power generation system for a nuclear reactor includes an externally-heated turbine engine, a reactor heat exchanger, and a heat recuperating system. The externally-heated turbine engine produces compressed air that is heated by the reactor heat exchanger. The heat recuperating system includes a heat exchanger thermally connected to the externally-heated turbine engine to transfer heat to the compressed air to supplement the reactor heat exchanger.

17 Claims, 3 Drawing Sheets

(56) References Cited

U.S. PATENT DOCUMENTS

| | | | | | |
|---|---|---|---|---|---|
| 5,267,288 | A | * | 11/1993 | Frutschi | G21D 5/08 60/39.181 |
| 5,687,570 | A | * | 11/1997 | Bronicki | F02C 7/08 60/683 |
| 5,799,490 | A | | 9/1998 | Bronicki et al. | |
| 2010/0050639 | A1 | | 3/2010 | Janus et al. | |
| 2010/0064688 | A1 | | 3/2010 | Smith | |

OTHER PUBLICATIONS

Colin F. McDonald and Charles R. Boland, The Nuclear Closed-Cycle Gas Turbine—Dry Cooled Commercial Power Plant Studies, Nov. 1979, https://www.osti.gov/servlets/purl/5664698, 21 pages.
International Atomic Energy Agency, Gas Turbine Power Conversion Systems for modular HTGRs, Aug. 2001, https://www-pub.iaea.org/MTCD/Publications/PDF/te_1238_prn.pdf, 216 pages.

* cited by examiner

SYSTEM FOR STARTUP SUPPORT OF EXTERNALLY HEATED TURBINE ENGINE

FIELD OF THE DISCLOSURE

The present disclosure relates generally to externally-heated turbine engines, and more specifically to control systems for externally-heated turbine engines.

BACKGROUND

Externally-heated gas turbine engines may be used to power aircraft, watercraft, and power generators. Externally-heated gas turbine engines typically include a compressor and a turbine, but utilize an external heat exchanger and heat source to raise the temperature of the working fluid within the engine. In this arrangement, it is possible for no combustion products to travel through the turbine. This allows externally-heated gas turbine engines to burn fuels that would ordinarily damage the internal components of the engine.

The compressor compresses air drawn into the engine and produces high pressure air for the external heat source. Heat is transferred to the high pressure air from the external heat source and the heated high pressure air is directed into the turbine where work is extracted to drive the compressor and, sometimes, a generator connected to an output shaft. Combustion products from the external heat source can be exhausted in an alternative region of the externally-heated turbine engine.

SUMMARY

The present disclosure may comprise one or more of the following features and combinations thereof.

A power-generation system for a nuclear reactor may include a power unit, a reactor heat exchanger, and a heat recuperating system. The power unit may include a first generator and a turbine engine. The first generator may produce electric energy. The turbine engine may be coupled to the first generator and configured to drive the first generator. The turbine engine may include a compressor and a turbine. The compressor may be configured to receive and compress ambient air to produce compressed air. The turbine may be configured to extract work from the compressed air after the compressed air is heated to drive the first generator.

The reactor heat exchanger may be in fluid communication with and between the compressor and the turbine. The reactor heat exchanger may be configured to transfer heat from the nuclear reactor to the compressed air to heat the compressed air. The heat recuperating system may be configured to transfer heat to the compressed air to supplement the reactor heat exchanger during a startup mode of the power-generation system. The heat recuperating system may comprise an auxiliary power unit and a recuperating heat exchanger that is fluidly connected with the auxiliary power unit. The auxiliary power unit may be configured to produce electric power and exhaust air. The recuperating heat exchanger may further be fluidly connected with the compressor and the turbine and configured to transfer heat from the heated exhaust air to the compressed air.

In some embodiments, the recuperating heat exchanger may be fluidly connected to the turbine engine and the reactor heat exchanger downstream of the compressor and upstream of the reactor heat exchanger. In another embodiment, the recuperating heat exchanger may be fluidly connected to the turbine engine and the reactor heat exchanger downstream of the reactor heat exchanger and upstream of the turbine.

In other embodiments, the power-generation system may further include a controller programmed to turn off the auxiliary power unit in response to the reactor heat exchanger heating the compressed air to a threshold temperature. In some embodiments, the heat recuperating system may further include a second generator coupled with the auxiliary power unit and configured to be driven by the auxiliary power unit. In a further embodiment, the auxiliary power unit may include a gas turbine engine.

According to another aspect of the present disclosure, a power generation system may include a power unit, a reactor heat exchanger, and a heat recuperating system. The power unit may include a first generator and an externally-heated turbine engine. The first generator may produce electric energy. The externally-heated turbine engine may have a compressor and a turbine. The compressor may be configured to produce compressed air. The turbine may be configured to drive the first generator.

The reactor heat exchanger may be in fluid communication with the compressor and the turbine and configured to transfer heat from a nuclear reactor to the compressed air. The heat recuperating system may have an auxiliary power unit and a recuperating heat exchanger. The recupereating heat exchanger may be fluidly connected with the auxiliary power unit and fluidly connected to the externally-heated turbine engine.

In some embodiments, the recuperating heat exchanger may be fluidly connected to the externally-heated turbine engine and the reactor heat exchanger downstream of the compressor and upstream of the reactor heat exchanger. In another embodiment, the recuperating heat exchanger is fluidly connected to the externally-heated turbine engine and the reactor heat exchanger downstream of the reactor heat exchanger and upstream of the turbine.

In other embodiments, the power generation system may further include a controller programmed to activate the auxiliary power unit included in the heat recuperating system in response to the reactor heat exchanger heating the compressed air to a temperature below a threshold temperature. The controller may further be programmed to turn off the auxiliary power unit included in the heat recuperating system in response to the reactor heat exchanger heating the compressed air to a temperature equal to or greater than the threshold temperature.

In a further embodiment, the controller may be programmed to idle the externally-heated turbine engine in response to the compressed air being heated to a temperature equal to or greater than the threshold temperature. In another embodiment, the heat recuperating system may further include a second generator coupled with the auxiliary power unit and configured to be driven by the auxiliary power unit. In other embodiments, the auxiliary power unit includes a turbine engine.

According another aspect of the present disclosure, a method of operating a power-generation system for a nuclear reactor may include the steps of operating an auxiliary power unit to generate electric energy and a heated first fluid and heating a second fluid with a reactor heat exchanger. The method may further include the steps of compressing air with a compressor, transferring heat from the first fluid to the compressed air, transferring heat from the second fluid to the compressed air, and conducting the compressed air through a turbine after transferring heat from the first fluid and the second fluid to the compressed air.

In some embodiments, the method may further include the step of transferring heat from the first fluid to the compressed air is performed after transferring heat from the second fluid to the compressed air. In another embodiment, the method may further include the step of transferring heat from the first fluid to the compressed air is performed prior to transferring heat from the second fluid to the compressed air.

In other embodiments, the method may further include the step of shutting off an engine included in the auxiliary power unit in response to a temperature of the compressed air being equal to a threshold temperature. In a further embodiment, the method may further include the step of driving a first generator with the turbine. In some embodiments, the method may further include the step of driving a second generator with the auxiliary power unit. In another embodiment, the auxiliary power unit includes a turbine engine.

These and other features of the present disclosure will become more apparent from the following description of the illustrative embodiments.

DETAILED DESCRIPTION OF THE DRAWINGS

Figure 1:
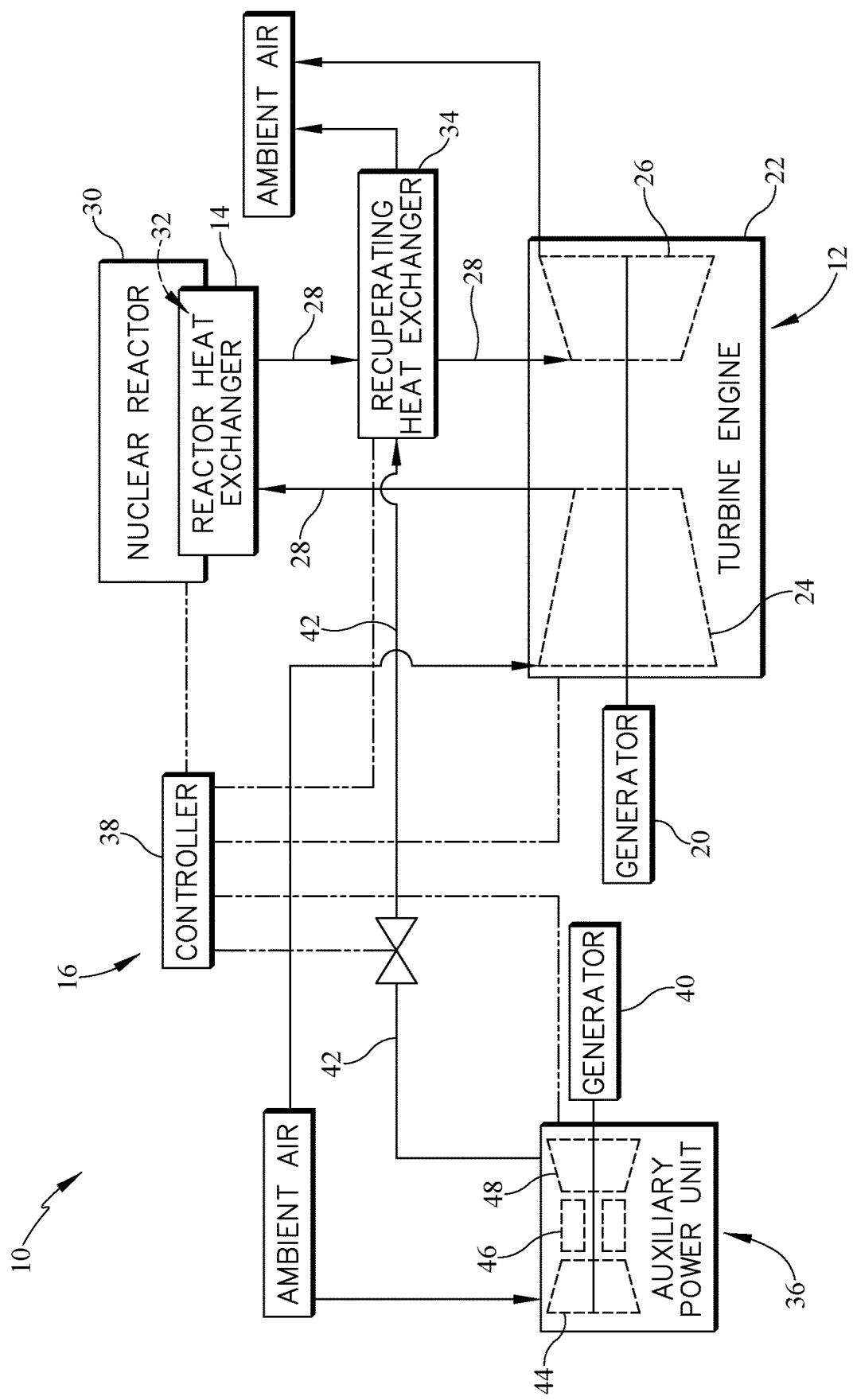
FIG. 1 is a diagrammatic view of a power-generation system according to the present disclosure, the system uses heat from a nuclear reactor to run a turbine engine which, in turn drives a generator to produce electric energy, the system further includes an auxiliary power unit and a recuperating heat exchanger fluidly connected to the auxiliary power unit and the turbine engine to supplement the heat from the nuclear reactor with exhaust air from the auxiliary power unit during a startup mode of the system.

For the purposes of promoting an understanding of the principles of the disclosure, reference will now be made to a number of illustrative embodiments illustrated in the drawings and specific language will be used to describe the same.

An illustrative power-generation system 10 in accordance with the present disclosure is configured to generate electricity using heat from a nuclear reactor as suggested in FIG. 1. The power-generation system includes a power unit 12, a reactor heat exchanger 14, and a heat recuperating system 16 as shown in FIG. 1. The power unit 12 includes a turbine engine 22 having a compressor 24 and a turbine 26 fluidly connected to the reactor heat exchanger 14. The reactor heat exchanger 14 is externally located from the turbine engine 22 and transfers heat to compressed air 28 provided by the compressor 24. The heated compressed air 28 is delivered to the turbine 26 so that the turbine 26 can extract power from the heated compressed air 28 and drive a first generator 20 to produce electric power for a facility, for example. The turbine engine 22 is configured to use air to operate and may be sometimes called a gas turbine engine.

The heat recuperating system 16 includes an auxiliary power unit 36, a controller 38, and a recuperating heat exchanger 34 that transfers additional heat to the compressed air 28 during a startup mode of the power-generation system 10. During the startup mode, the reactor heat exchanger 14 alone may be unable to heat the compressed air 28 to a threshold temperature that allows the turbine engine 22 to rotate at an idle speed. The controller 38 activates the auxiliary power unit 36 during the startup mode to supply exhaust air 42 to the recuperating heat exchanger 34. The recuperating heat exchanger 34 is fluidly coupled with the exhaust air 42 and the compressed air 28 and transfers heat from the exhaust air 42 to the compressed air 28. The controller 38 operates the auxiliary power unit 36 to heat the compressed air 28 to the threshold temperature. The recuperating heat exchanger 34 is a gas-to-gas heat exchanger in the illustrative embodiment.

The power unit 12 includes a first generator 20 and the turbine engine 22 as shown in FIG. 1. The turbine engine 22 includes the compressor 24 and the turbine 26. The compressor 24 and the first generator 20 are mechanically coupled to the turbine 26 and powered by the turbine 26. Ambient air is delivered to the compressor 24 which produces compressed air 28. The compressed air 28 is heated by the reactor heat exchanger 14 and then is received by the turbine 26. The turbine 26 extracts work from the heated compressed air 28 to produce power that drives the compressor 24 and the first generator 20.

The first generator 20 produces an electrical power load that may power an auxiliary device such as a building, aircraft, or provide surplus electricity to an electrical grid. During operation of the power-generation system 10, a load demand of electrical power on the first generator 20 may vary such that the turbine 26 may need to provide more or less power to drive the first generator 20 to meet the load demand.

The reactor heat exchanger 14 is fluidly coupled to the compressor 24 and the turbine 26 and located external to the turbine engine 22 as shown in FIG. 1. The reactor heat exchanger 14 transfers heat to the compressed air 28 provided by the compressor 24, and delivers heated compressed air to the turbine 26. In the illustrative embodiment, the reactor heat exchanger 14 is coupled with a nuclear reactor 30. In some embodiments, the reactor heat exchanger 14 may be connected to a different heat source that uses a different fuel such as a coal, natural gas, or biomass, or the heat source could generate heat from solar energy. In the illustrative embodiment, the reactor heat exchanger 14 is a gas-to-gas heat exchanger and has heated nitrogen supplied to it on the nuclear reactor side.

The nuclear reactor 30 heats a first fluid 32, and the reactor heat exchanger 14 is fluidly coupled with the first fluid 32 and the compressed air 28 to transfer heat from the first fluid 32 to the compressed air 28. During steady operation of the power-generation system 10, the nuclear reactor 30 provides generally constant heat that is transferred to the compressed air 28 via the reactor heat exchanger 14. During a startup mode, the nuclear reactor 30 may be slow to generate heat in the first fluid 32 so that insufficient heat is transferred to the compressed air 28 and unable to increase the temperature of the compressed air 28 to the threshold temperature.

The turbine engine 22 is configured to operate at least at an idle speed and may not be able to do so in response to the temperature of the compressed air 28 being below the threshold temperature. The threshold temperature of the compressed air 28 allows the turbine 26 to extract sufficient work from the compressed air 28 to operate the compressor 24 and the first generator 20 at the idle speed. If the compressed air 28 is at or above the threshold temperature, the turbine 26 can produce additional power and drive the first generator to produce additional electrical power. If the compressed air 28 is below the threshold temperature, the turbine 26 may extract insufficient work from the compressed air 28 so that the turbine 26 cannot operate the compressor 24 and the first generator 20 without support from an auxiliary system.

The heat recuperating system 16 transfers additional heat to the compressed air 28 to supplement the reactor heat exchanger 14 during the startup mode of the power-generation system 10. The heat recuperating system 16 includes a recuperating heat exchanger 34, an auxiliary power unit 36, and a controller 38 as shown in FIG. 1. The heat recuperating system 16 increases the temperature of the compressed air 28 to the threshold temperature.

The recuperating heat exchanger 34 is fluidly coupled to the auxiliary power unit 36 that provides a flow of exhaust air 42 to the recuperating heat exchanger 34 as shown in FIG. 1. The recuperating heat exchanger 34 is fluidly connected with the compressed air 28 and the exhaust air 42 to transfer heat from the exhaust air 42 to the compressed air 28. In the illustrative embodiment of FIG. 1, the recuperating heat exchanger 34 is connected to and located between the reactor heat exchanger 14 and the turbine 26.

The auxiliary power unit 36 produces hot exhaust air 42 and powers a second generator 40 that is coupled to the auxiliary power unit 36 as shown in FIG. 1. In the illustrative embodiment, the auxiliary power unit 36 is a turbine engine and includes a compressor 44, a combustor 46, and a turbine 48. The compressor 44 receives and compresses ambient air and the combustor 46 mixes the compressed ambient air with fuel and ignites the mixture. Work is extracted from the ignited mixture by the turbine 48, and the turbine 48 is coupled with and drives the second generator 40 to produce electrical power to the power-generation system 10 for example at the startup mode of the system 10. The gas turbine engine 36 is smaller in power output capabilities than the turbine engine 22 in illustrative embodiments.

The heat recuperating system 16 transfers heat from the waste exhaust air 42 from the turbine 48 of the auxiliary power unit 36 to increase the temperature of the compressed air 28 via the recuperating heat exchanger 34. In some embodiments, the auxiliary power unit 36 may be another power generation device that exhausts hot air such as a diesel generator or a steam engine.

The second generator 40 is driven by the auxiliary power unit 36 to produce electrical power. In some embodiments, the second generator 40 is configured to provide electrical power to the components of the power-generation system 10 only. In other embodiments, the second generator 40 may provide electrical power to an auxiliary device such as a building, aircraft, or provide surplus electricity to an electrical grid. The second generator 40 is smaller (in kW output capability) than the first generator 20.

Figure 2:
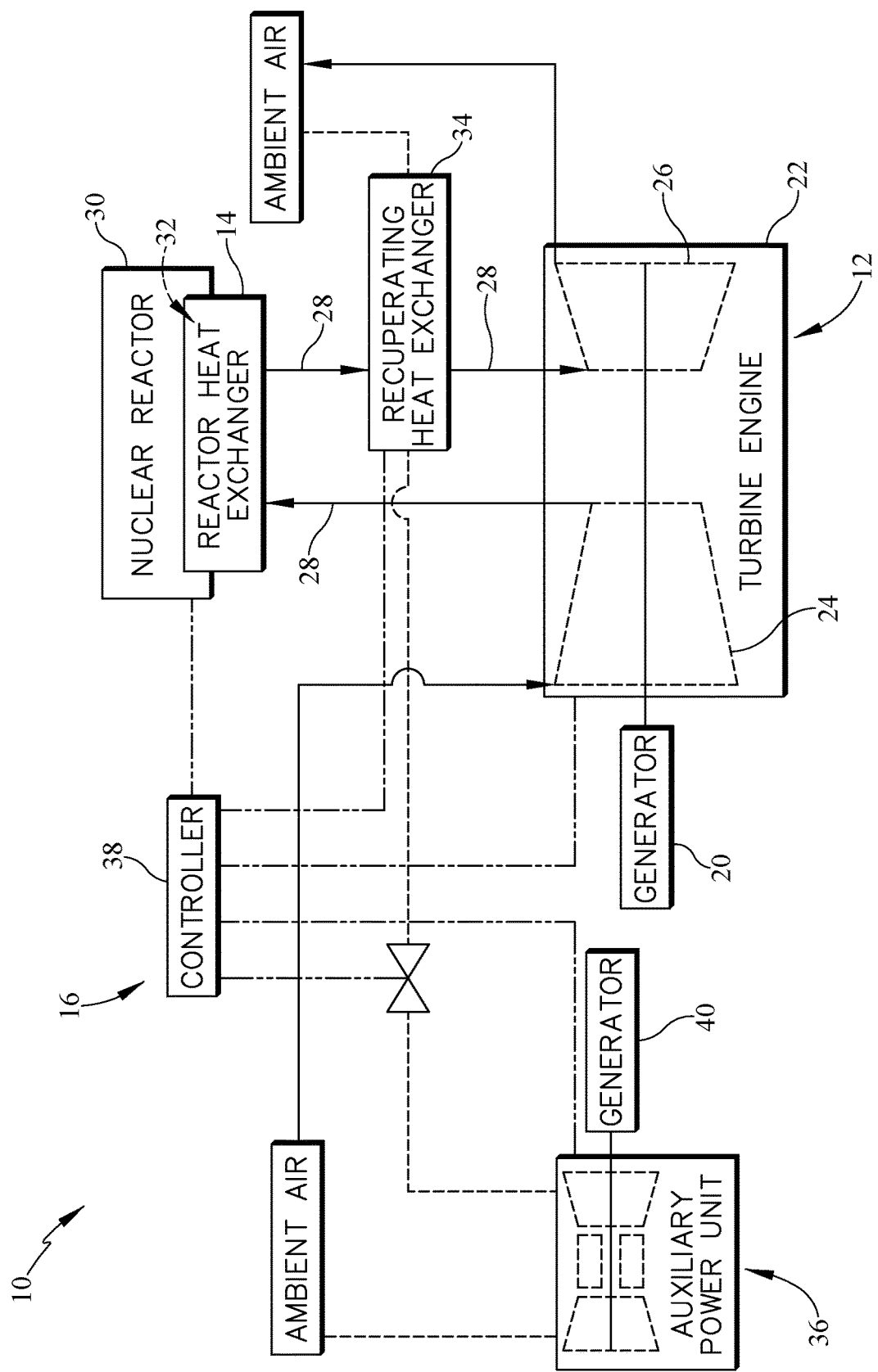
FIG. 2 is a diagrammatic view showing the system of FIG. 1 after the startup mode of the system and suggesting that the auxiliary power unit is shut off and does not supply heated exhaust air to the recuperating heat exchanger because the nuclear reactor is supplying sufficient heat to the turbine engine.

The controller 38 is connected to the turbine engine 22, the nuclear reactor 30, recuperating heat exchanger 34, and the auxiliary power unit 36 in the illustrative embodiment as shown in FIGS. 1 and 2. The controller 38 selectively operates each of the elements of the power-generation system 10 in response to a mode of the power-generation system 10, a temperature of the compressed air 28 at the inlet of the turbine 26, and/or a load demand of the first generator 20. The controller 38 may activate, deactivate, or vary the power level of any of the turbine engine 22, the nuclear reactor 30, or the auxiliary power unit 36.

In the illustrative embodiment shown in FIG. 1, the controller 38 is operating the power-generation system 10 in the startup mode. In the startup mode, the nuclear reactor 30 is not operating at steady state and the reactor heat exchanger 14 transfers insufficient heat to the compressed air 28 so that the compressed air 28 is below the threshold temperature and the turbine engine 22 is unable to operate at an idle speed. In the startup mode, the controller 38 activates the auxiliary power unit 36 to power the system 10 and also so that the hot exhaust air 42 is provided to the recuperating heat exchanger 34 and transfers heat to the compressed air 28. The controller 38 may maintain the configuration as shown in FIG. 1 to heat the compressed air 28 to at least the threshold temperature so that the turbine engine 22 can operate at idle speed using power from the turbine 26.

In the illustrative embodiment shown in FIG. 2, the controller 38 is operating the power-generation system 10 in a running mode that may follow the startup mode. During the running mode, the controller 38 deactivates the auxiliary power unit 36 in response to the reactor heat exchanger 14 heating the compressed air 28 a temperature that is equal to or greater than the threshold temperature without additional supplemental heat from the heat recuperating system 16. During the running mode, the auxiliary power unit 36 does not produce exhaust air 42 and no heat is transferred to the compressed air 28 by the recuperating heat exchanger 34. The second generator 40 is not driven by the auxiliary power unit 36 and stops producing electrical power. During the running mode, the first generator 20 provides all electrical power to the components of the power-generation system 10. The controller 38 operates the turbine engine 22 at least at an idle rotational speed in the running mode.

In some embodiments, the controller 38 may activate the auxiliary power unit 36 during a power-increase mode in response to an increased load demand on the first generator 20. During the power-increase mode, the controller 38 activates the auxiliary power unit 36 to provide hot exhaust air 42 to the recuperating heat exchanger 34 so that additional heat is transferred to the compressed air 28 and the turbine 26 extracts additional work from the heated compressed air 28.

Figure 3:
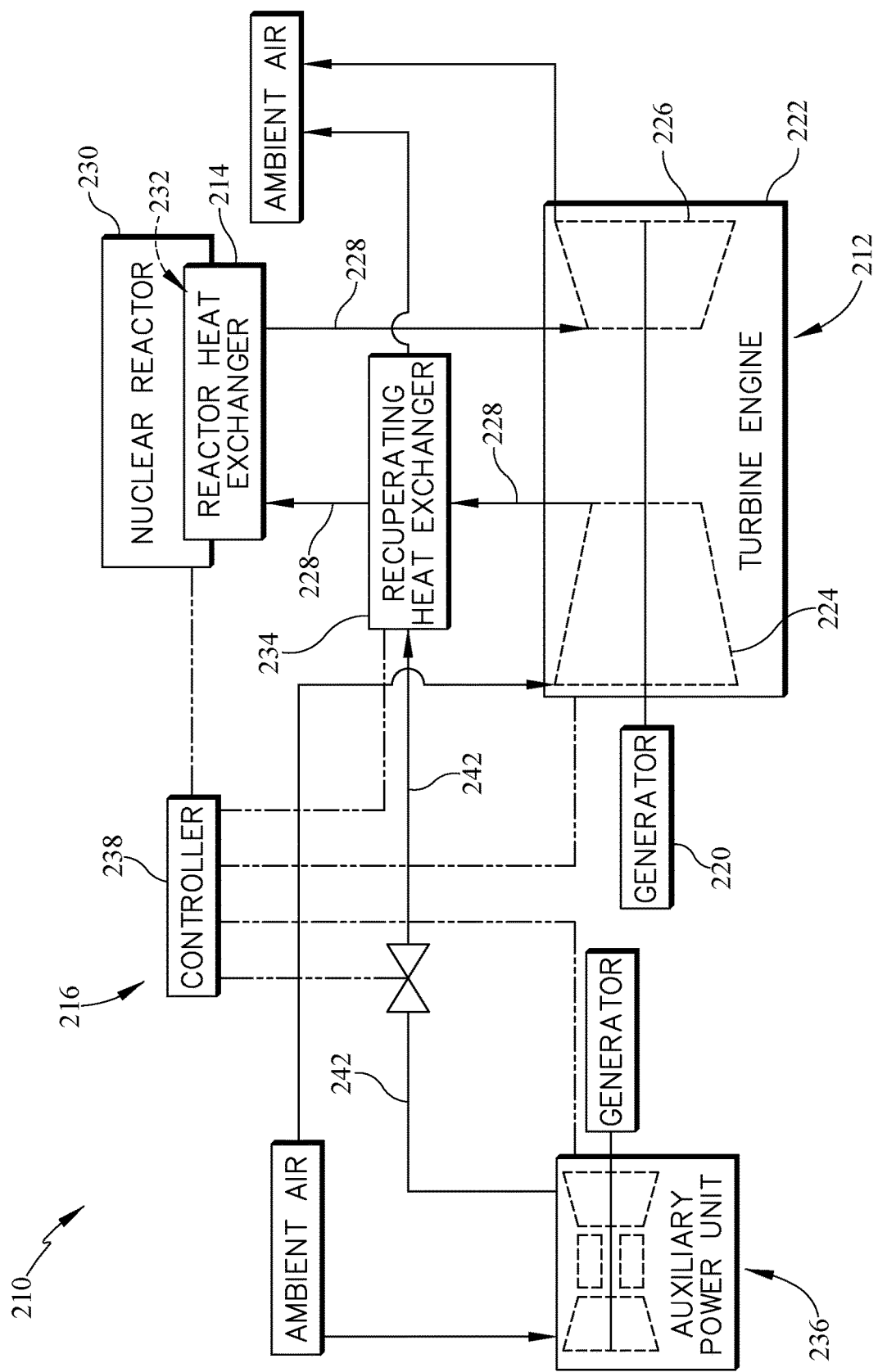
FIG. 3 is another diagrammatic view of a power-generation system including a generator coupled to a turbine engine, a nuclear reactor fluidly coupled to a compressor and a turbine of the turbine engine, and an auxiliary power unit and a recuperating heat exchanger coupled to the auxiliary power unit, and the recuperating heat exchanger is fluidly connected to the power unit between the compressor and the nuclear reactor heat exchanger.

Another embodiment of a power-generation system 210 in accordance with the present disclosure is shown in FIG. 3. The power-generation system 210 is substantially similar to the power-generation system 10 shown in FIGS. 1 and 2 and described herein. Accordingly, similar reference numbers in the 200 series indicate features that are common between the power-generation system 210 and the power-generation system 10. The description of the power-generation system 10 is incorporated by reference to apply to the power-generation system 210, except in instances when it conflicts with the specific description and the drawings of the power-generation system 210.

The power-generation system 210 includes a power unit 212, a reactor heat exchanger 214, and a heat recuperating system 216 as shown in FIG. 3. The power unit 212 includes a generator 220 and a turbine engine 222. The turbine engine 222 includes a compressor 224 and a turbine 226. The reactor heat exchanger 214 is fluidly coupled with the compressor 224 and the turbine 226 and externally located from the turbine engine 222. The reactor heat exchanger 214 transfers heat to the compressed air 228 provided by the compressor 224, and delivers heated compressed air 228 to the turbine 226. In the illustrative embodiment, the reactor heat exchanger 214 is connected to a nuclear reactor 230 to transfer heat from the nuclear reactor 230 through the reactor heat exchanger 214 and to the compressed air 228.

The heat recuperating system 216 transfers additional heat to the compressed air 228 to supplement the reactor heat exchanger 214 during the startup mode of the power-generation system 210. The heat recuperating system 16 includes a recuperating heat exchanger 234, an auxiliary power unit 236, and a controller 238 as shown in FIG. 3. The heat recuperating system 216 increases the temperature of the compressed air 228 to the threshold temperature.

The recuperating heat exchanger 234 is connected to the auxiliary power unit 236 to provide a flow of hot exhaust air 242 to the recuperating heat exchanger 234 as shown in FIG. 3. The recuperating heat exchanger 234 is fluidly connected with the compressed air 228 and the exhaust air 242 to transfer heat from the exhaust air 242 to the compressed air 228. In the illustrative embodiment of FIG. 3, the recuperating heat exchanger 234 is connected to and located between the compressor 224 and the reactor heat exchanger 214.

The present disclosure may use an auxiliary power unit 36 waste heat recuperating device 16 to provide a source of additional heat flux to a primary gas flow to assist a more slowly reacting heat flux source 30 during a startup mode of a power-generation system 10. In a system with a slowly reacting heat flux such as a nuclear reactor 30, generation of a main heat source during the startup mode may be insufficient to support power demands of the power-generation system 10. An auxiliary energy source such as an auxiliary power unit 36 may generate a large amount of waste heat. The heat source 30 driving the primary turbine 22 may be increased through a slow process comparative to traditional internal combustion turbines. By recuperating waste heat from the combustion process of the auxiliary power unit 36 through a recuperating heat exchanger 34, the inlet temperature to the primary turbine 26 may be increased which may reduce power required for starting the power-generation system 10.

During the startup mode, the reactor 30 may have a flow rate through the reactor heat exchanger 14 to absorb heat from the reactor cooling loop. Prior to the exit temperature of the reactor heat exchanger 14 exceeding the temperature of the exhaust air 42 of the auxiliary power unit 36, the main heat flux source may be augmented through the use of the heat recuperating system 16.

In some embodiments, the temperature of the core flow path of the turbine engine 22 may be supplemented with an auxiliary power unit waste heat recuperator system 16. The reactor flow back to the primary turbine engine 22 may recuperate auxiliary power unit waste heat through a heat exchanger 34 as seen in FIG. 1. The recuperated heat may provide an increase in inlet temperature of the turbine 26 of the turbine engine 22 during the startup mode.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A power-generation system for a nuclear reactor, the power-generation system comprising
   a power unit that includes a first generator for producing electric energy and a turbine engine coupled to and configured to drive the first generator, the turbine engine includes a compressor configured to receive and compress ambient air to produce compressed air and a turbine configured to extract work from the compressed air after the compressed air is heated to drive the first generator,
   a reactor heat exchanger in fluid communication with and between the compressor and the turbine and configured to transfer heat from the nuclear reactor to the compressed air to heat the compressed air, and
   a heat recuperating system configured to transfer heat to the compressed air to supplement the reactor heat exchanger during a startup mode of the power-generation system, the heat recuperating system comprising an auxiliary power unit and a recuperating heat exchanger that is fluidly connected with the auxiliary power unit, the auxiliary power unit configured to produce electric power and heated exhaust air, and the recuperating heat exchanger is further fluidly connected with the compressor and the turbine and configured to transfer heat from the heated exhaust air to the compressed air,
   wherein the power-generation system further includes a controller programmed to turn off the auxiliary power unit in response to the reactor heat exchanger heating the compressed air to a threshold temperature.

2. The power-generation system of claim 1, wherein the recuperating heat exchanger is fluidly connected to the turbine engine and the reactor heat exchanger downstream of the compressor and upstream of the reactor heat exchanger.

3. The power-generation system of claim 1, wherein the recuperating heat exchanger is fluidly connected to the turbine engine and the reactor heat exchanger downstream of the reactor heat exchanger and upstream of the turbine.

4. The power-generation system of claim 1, wherein the heat recuperating system further includes a second generator coupled with the auxiliary power unit and configured to be driven by the auxiliary power unit.

5. The power-generation system of claim 4, wherein the auxiliary power unit comprises a gas turbine engine.

6. A power generation system comprising
   a power unit that includes a first generator for producing electric energy and an externally-heated turbine engine having a compressor configured to produce compressed air and a turbine configured to drive the first generator,
   a reactor heat exchanger in fluid communication with the compressor and the turbine and configured to transfer heat from a nuclear reactor to the compressed air, and
   a heat recuperating system having an auxiliary power unit and a recuperating heat exchanger fluidly connected with the auxiliary power unit and fluidly connected to the externally-heated turbine engine,
   wherein the power generation system further includes a controller programmed to activate the auxiliary power unit included in the heat recuperating system in response to the reactor heat exchanger heating the compressed air to a temperature below a threshold temperature and to turn off the auxiliary power unit included in the heat recuperating system in response to the reactor heat exchanger heating the compressed air to a temperature equal to or greater than the threshold temperature.

7. The power generation system of claim 6, wherein the recuperating heat exchanger is fluidly connected to the externally-heated turbine engine and the reactor heat exchanger downstream of the compressor and upstream of the reactor heat exchanger.

8. The power generation system of claim 6, wherein the recuperating heat exchanger is fluidly connected to the externally-heated turbine engine and the reactor heat exchanger downstream of the reactor heat exchanger and upstream of the turbine.

9. The power generation system of claim 6, wherein the controller is programmed to idle the externally-heated turbine engine in response to the compressed air being heated to a temperature equal to or greater than the threshold temperature.

10. The power generation system of claim 6, wherein the heat recuperating system further includes a second generator coupled with the auxiliary power unit and configured to be driven by the auxiliary power unit.

11. The power generation system of claim 10, wherein the auxiliary power unit includes a turbine engine.

12. A method of operating a power-generation system for a nuclear reactor, the method comprising,
operating an auxiliary power unit to generate electric energy and a heated first fluid,
heating a second fluid with a reactor heat exchanger,
compressing air with a compressor to produce compressed air,
transferring heat from the first fluid to the compressed air,
transferring heat from the second fluid to the compressed air, and
conducting the compressed air through a turbine after transferring heat from the first fluid and the second fluid to the compressed air,
further comprising shutting off an engine included in the auxiliary power unit in response to a temperature of the compressed air being equal to a threshold temperature.

13. The method of claim 12, wherein transferring heat from the first fluid to the compressed air is performed after transferring heat from the second fluid to the compressed air.

14. The method of claim 12, wherein transferring heat from the first fluid to the compressed air is performed prior to transferring heat from the second fluid to the compressed air.

15. The method of claim 12, further comprising driving a first generator with the turbine.

16. The method of claim 15, further comprising driving a second generator with the auxiliary power unit.

17. The method of claim 12, wherein the auxiliary power unit includes a turbine engine.

* * * * *